United States Patent
Johnson

(10) Patent No.: US 6,916,167 B2
(45) Date of Patent: Jul. 12, 2005

(54) METHOD AND APPARATUS FOR EXTRUSION BLOW MOLDING OF SHAPES WITH AN EVEN WALL THICKNESS AND VARYING RADII

(76) Inventor: David Johnson, R. R. #5, Amherst, Nova Scotia (CA), B4H 3 Y3

( * ) Notice: Subject to any disclaimer, the term of this patent is extended or adjusted under 35 U.S.C. 154(b) by 358 days.

(21) Appl. No.: 10/216,768

(22) Filed: Aug. 13, 2002

(65) Prior Publication Data

US 2003/0030190 A1 Feb. 13, 2003

Related U.S. Application Data

(60) Provisional application No. 60/311,368, filed on Aug. 13, 2001.

(51) Int. Cl.[7] ........................ B29C 49/04; B29C 49/48; B29C 49/64
(52) U.S. Cl. ........................ 425/526; 425/527; 425/532
(58) Field of Search ................................ 425/526, 532, 425/527; 264/520, 529, 540, 541

(56) References Cited

U.S. PATENT DOCUMENTS

| 2,952,034 A | * | 9/1960 | Cecil ........................... 264/543 |
| 3,272,896 A | * | 9/1966 | Winchester, Jr. ............ 264/533 |
| 3,423,495 A | * | 1/1969 | Bachner ...................... 264/526 |
| 3,601,858 A | * | 8/1971 | Blanchard .................... 425/86 |
| 4,127,430 A | * | 11/1978 | Davis .................... 156/244.14 |
| 4,348,167 A | * | 9/1982 | Virog, Jr. .................... 425/522 |
| 4,518,558 A | * | 5/1985 | Anway et al. .............. 264/515 |
| 5,858,301 A | * | 1/1999 | Hashimoto .................. 264/531 |
| 6,074,596 A | * | 6/2000 | Jacquet ....................... 264/529 |
| 6,488,883 B1 | * | 12/2002 | Wrobbel ..................... 264/515 |

FOREIGN PATENT DOCUMENTS

| JP | 01022528 A | * | 1/1989 | ........... B29C/49/48 |
| JP | 01247134 A | * | 10/1989 | ........... B29C/49/04 |

* cited by examiner

Primary Examiner—Robert B. Davis
(74) Attorney, Agent, or Firm—Freedman & Associates

(57) ABSTRACT

A method of extrusion blow molding is disclosed; the method allows the finished part to have consistent and even wall thickness within a broad range of local mold radii. This result is achieved without resorting to injection blow molding or other common techniques of deforming the parison.

8 Claims, 12 Drawing Sheets

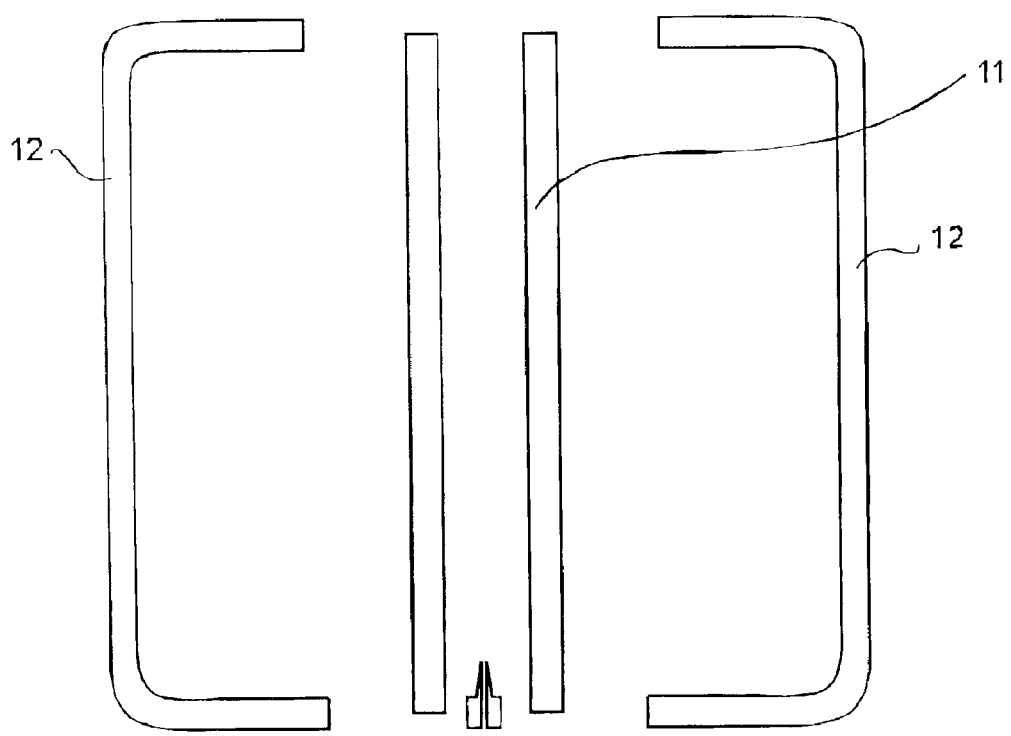
FIG. 1
PriorArt

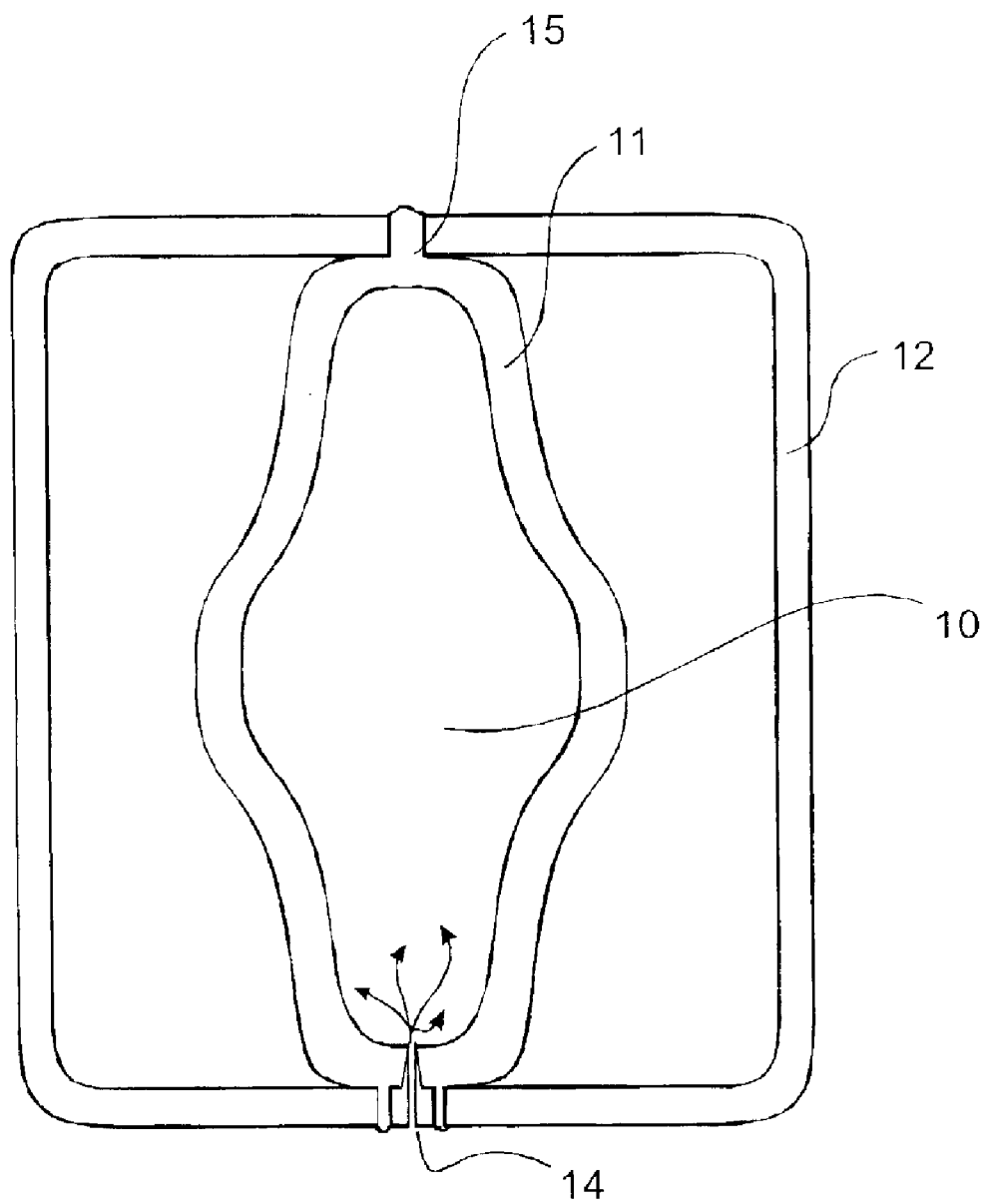
FIG. 1a
PriorArt

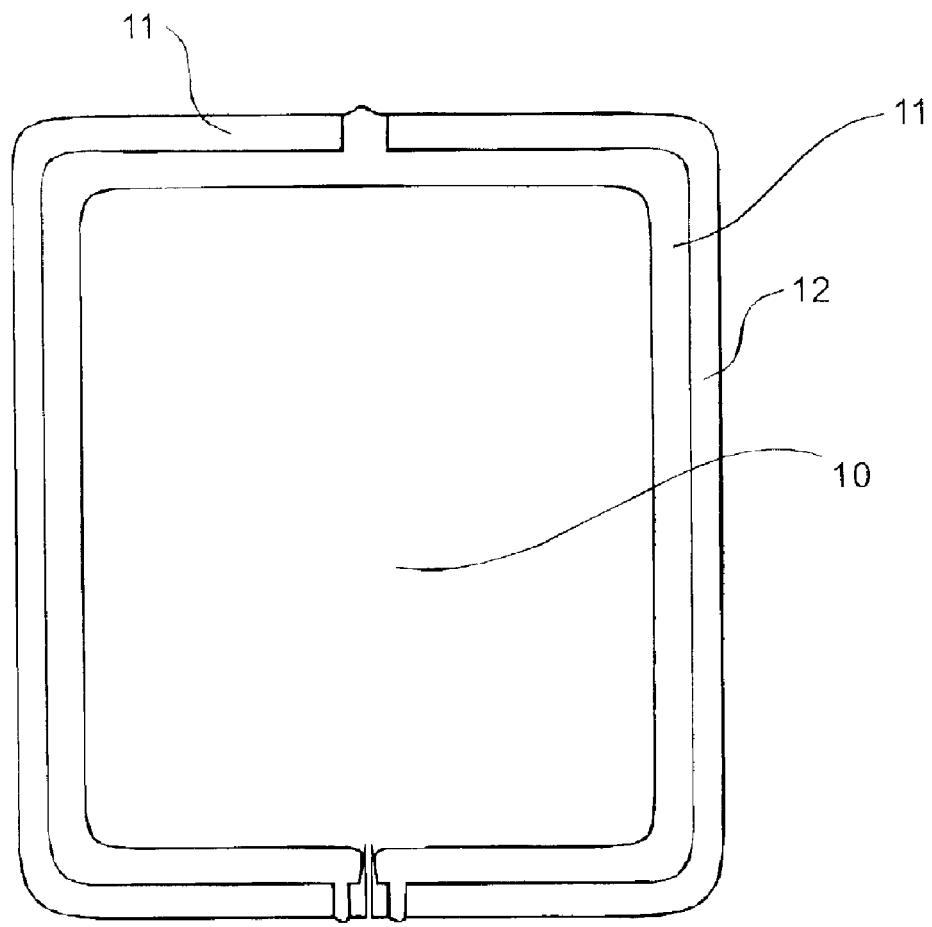
FIG. 1b
PriorArt

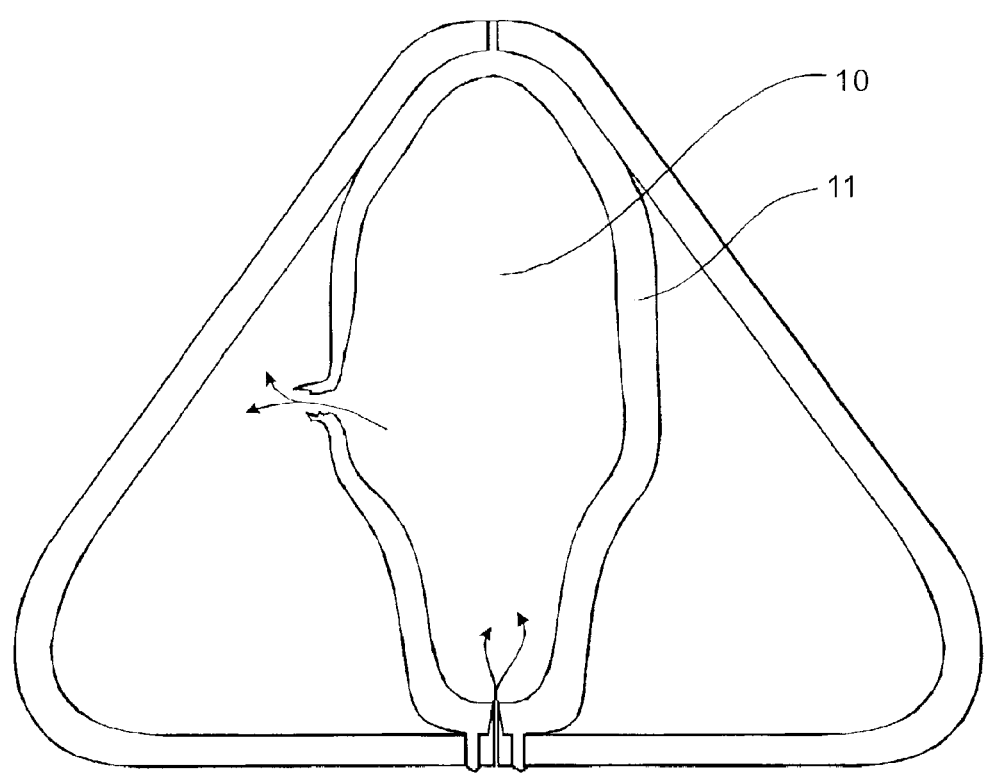
FIG. 2
PriorArt

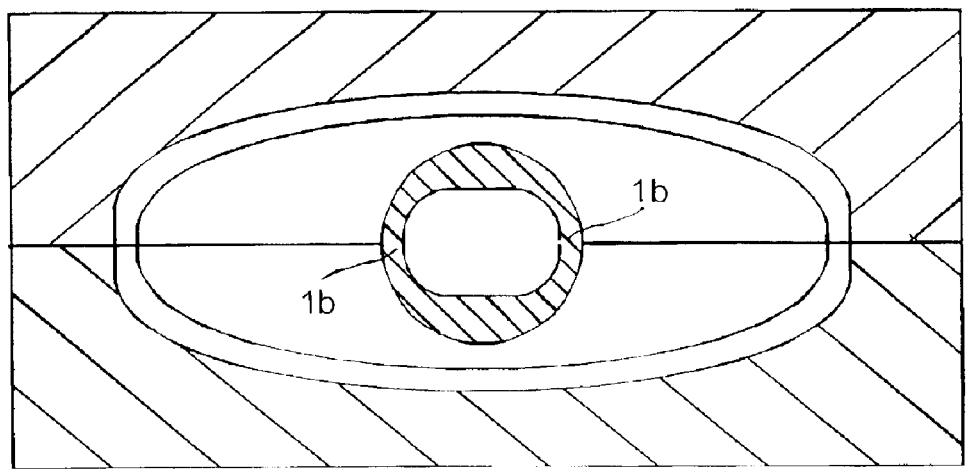
FIG. 3
PriorArt

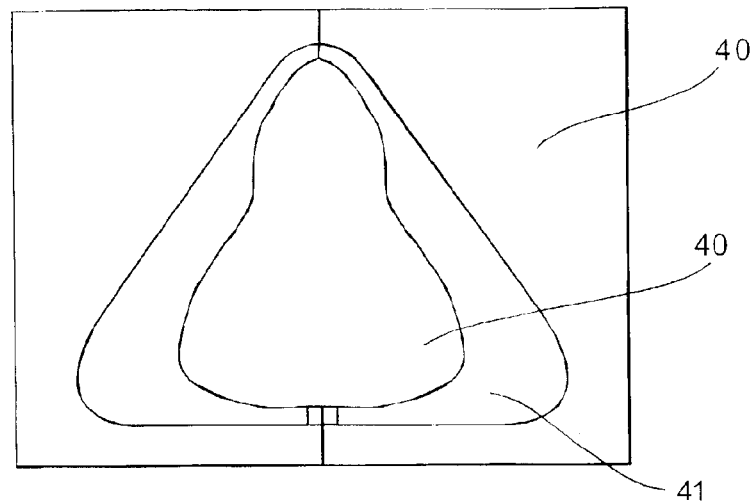
FIG. 4
PriorArt
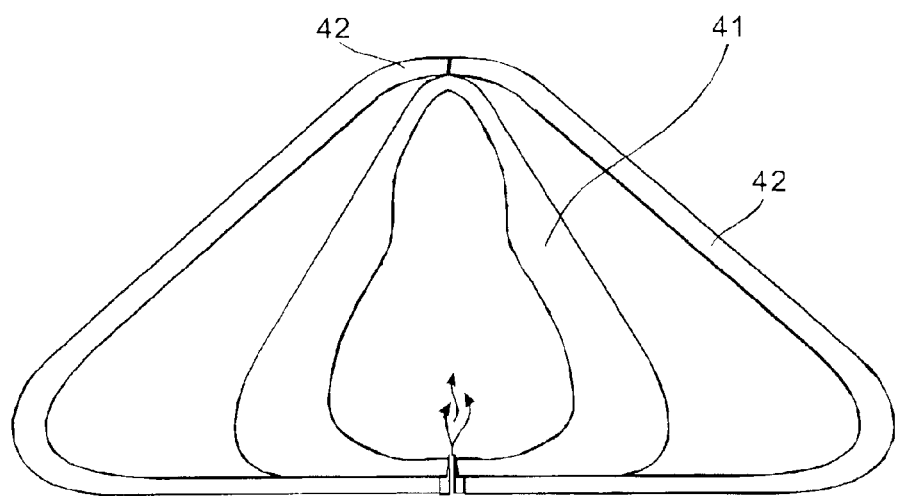
FIG. 4a
PriorArt

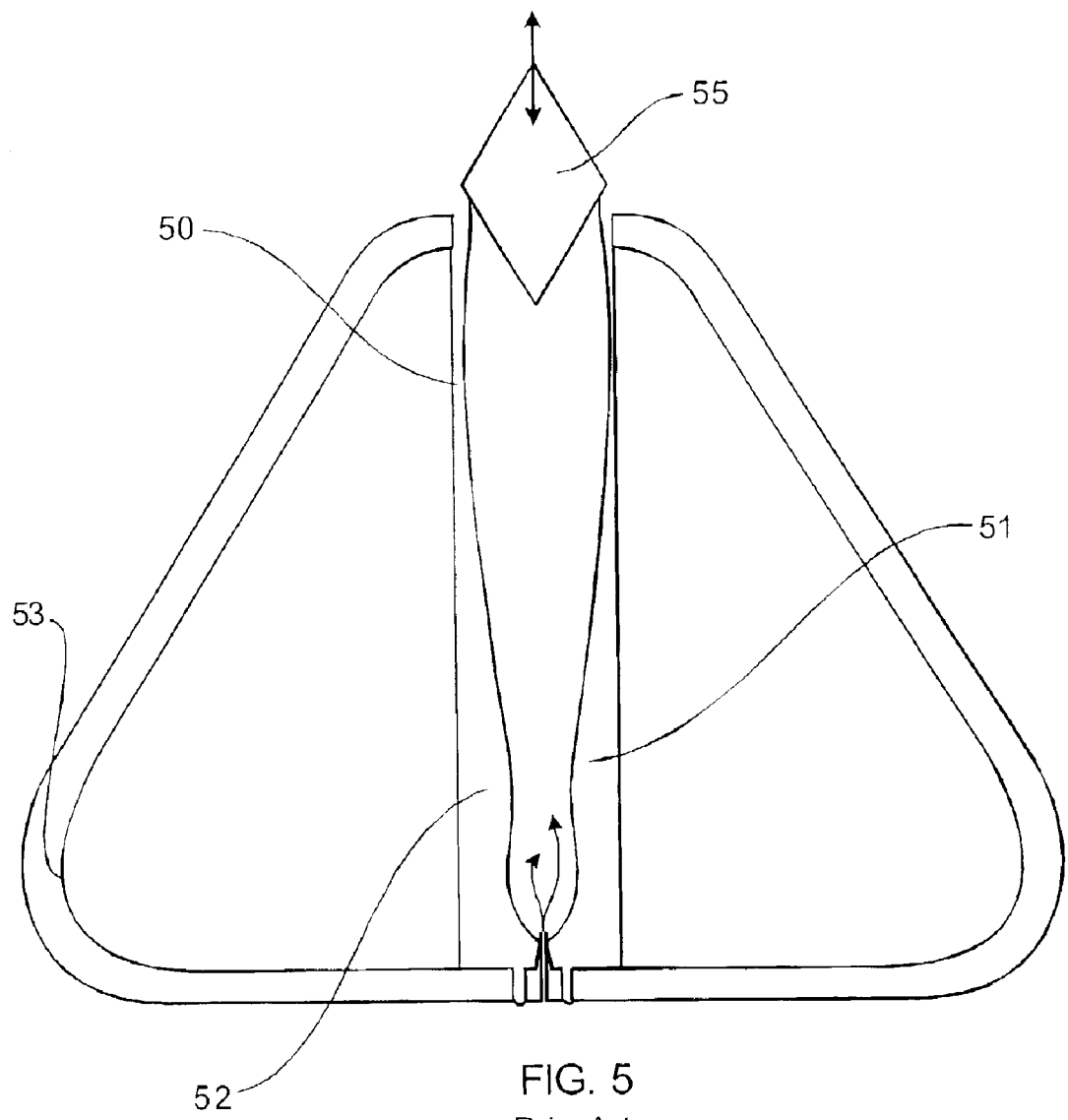
FIG. 5
PriorArt

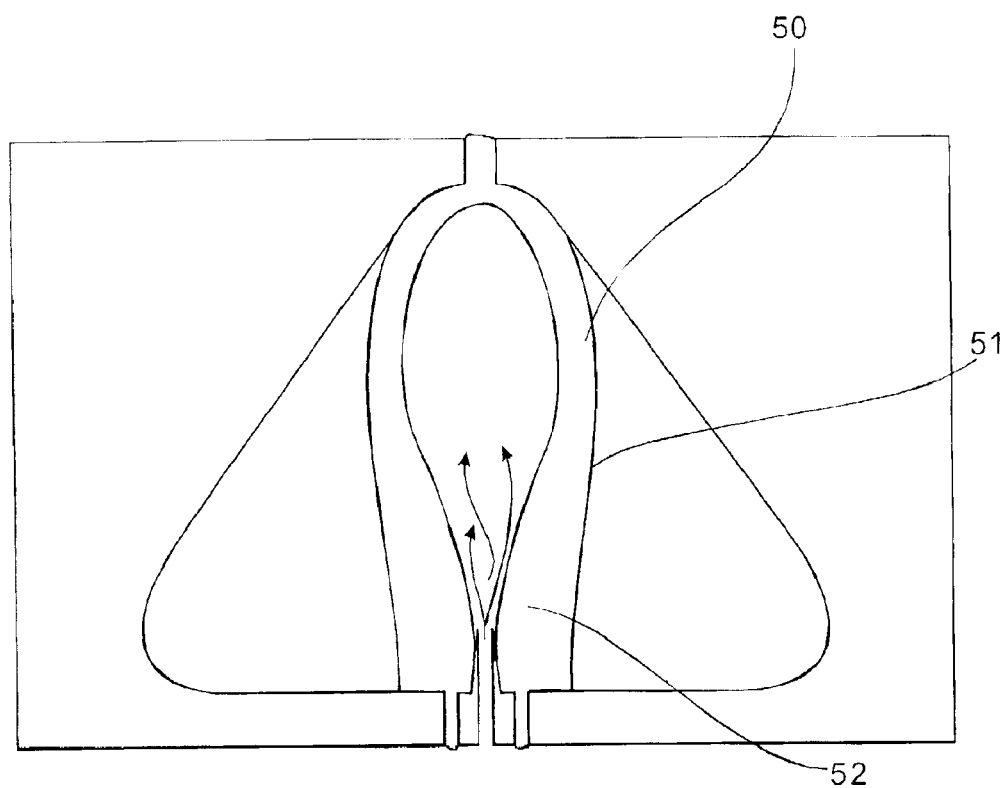
FIG. 6
PriorArt

METHOD AND APPARATUS FOR EXTRUSION BLOW MOLDING OF SHAPES WITH AN EVEN WALL THICKNESS AND VARYING RADII

This application claims the benefit of U.S. Provisional Application No. 60/311,368 filed Aug. 13, 2001.

FIELD OF THE INVENTION

This invention relates to blow molding and more particularly to blow molding parts whose radius varies substantially. Additionally, this invention relates specifically to blow molded parts with wide open ends.

BACKGROUND OF THE INVENTION

Blow molding is a commonly used technique to produce a variety of thin walled containers. Unlike injection molding, blow molding does not rely on very high pressure to form the finished part. Instead, a parison is provided in a mold and inflated or blown. Air between the parison and the mold escapes the mold through venting channels. Since the pressure used is low in comparison to injection molding, the mold is relatively inexpensive. This procedure is used to make a wide variety of plastic containers such as plastic bottles and pails.

A variety of prior art exists that describes different ways of producing different blow molded shapes. For example, in U.S. Pat. No. 4,724,116 to Aoki et al., a parison having a varying thickness is used to produce a blow-molded bottle. The bottle has a substantially elliptical cross section. Thus, the parison used in this process features thin walls in the region where more expansion is desired and thicker walls where less expansion is desired.

A person of skill in the art of blow molding, after having reviewed Aoki et al. might conclude that a substantially conical shape would be produced by varying the thickness of the parison as a function of parison length. Although this will work to an extent, it is flawed in that the thin section of the parison is most easily expanded, and consequently, if the thin section is too thin relative to the thick section the parison will fail by rupturing prior to taking the shape of the blow mold. This failure represents a waste of time and material.

Alternatively, a parison with consistent thick walls is used. Although this technique will work to an extent, it results in a container having walls with different thickness. Ideally, a less wasteful container will have uniformly thin walls regardless of the shape of the container. This saves material and consequently reduces operating costs.

Additionally, many shapes with a substantial variation in radius have at least one open end as well. Typically, producing such a shape involves blowing a sealed container shape and cutting away the openings. As the area of the opening is quite large, material that is cut away represents a substantial portion of the original parison.

It would be advantageous to provide a new technique of extrusion blow molding that produces even wall thickness over areas of differing radii while keeping the costs of the parts and the tools to a minimum. Additionally, it would be beneficial if such a technique supported shapes with a large opening without the operations associated with cutting away material.

BRIEF DESCRIPTION OF THE DRAWINGS

The invention will now be described with reference to the drawings in which:

FIG. 1 is a simplified section view of an open mold with an extruded parison therein according to the prior art;

FIG. 1a is a simplified section view of a closed mold with a partially inflated parison according to the prior art;

FIG. 1b is a simplified section view of a closed mold with a finished molded parison according to the prior art;

FIG. 2 is a simplified section view of a closed conical mold in which a parison with a thin wall has failed to inflate properly according to the prior art;

FIG. 3 is a simplified section view of a prior art blow mold with a parison whose interior cavity shape is not circular;

FIG. 4 is a simplified section view of a prior art injection mold for producing a hollow conical parison;

FIG. 4a is a simplified section view of a prior art blow mold with a conical parison whose walls are not equally thick for producing a substantially conical shape;

FIG. 5 is a simplified section view of a prior art conical blow mold with a retractable extrusion head and a parison with varying wall thickness;

FIG. 6 is a simplified section view of a prior art conical blow mold in which a parison of varying wall thickness is being inflated wherein the thin wall of the parison is the first to be stretched;

DETAILED DESCRIPTION OF THE INVENTION

Figure 7:
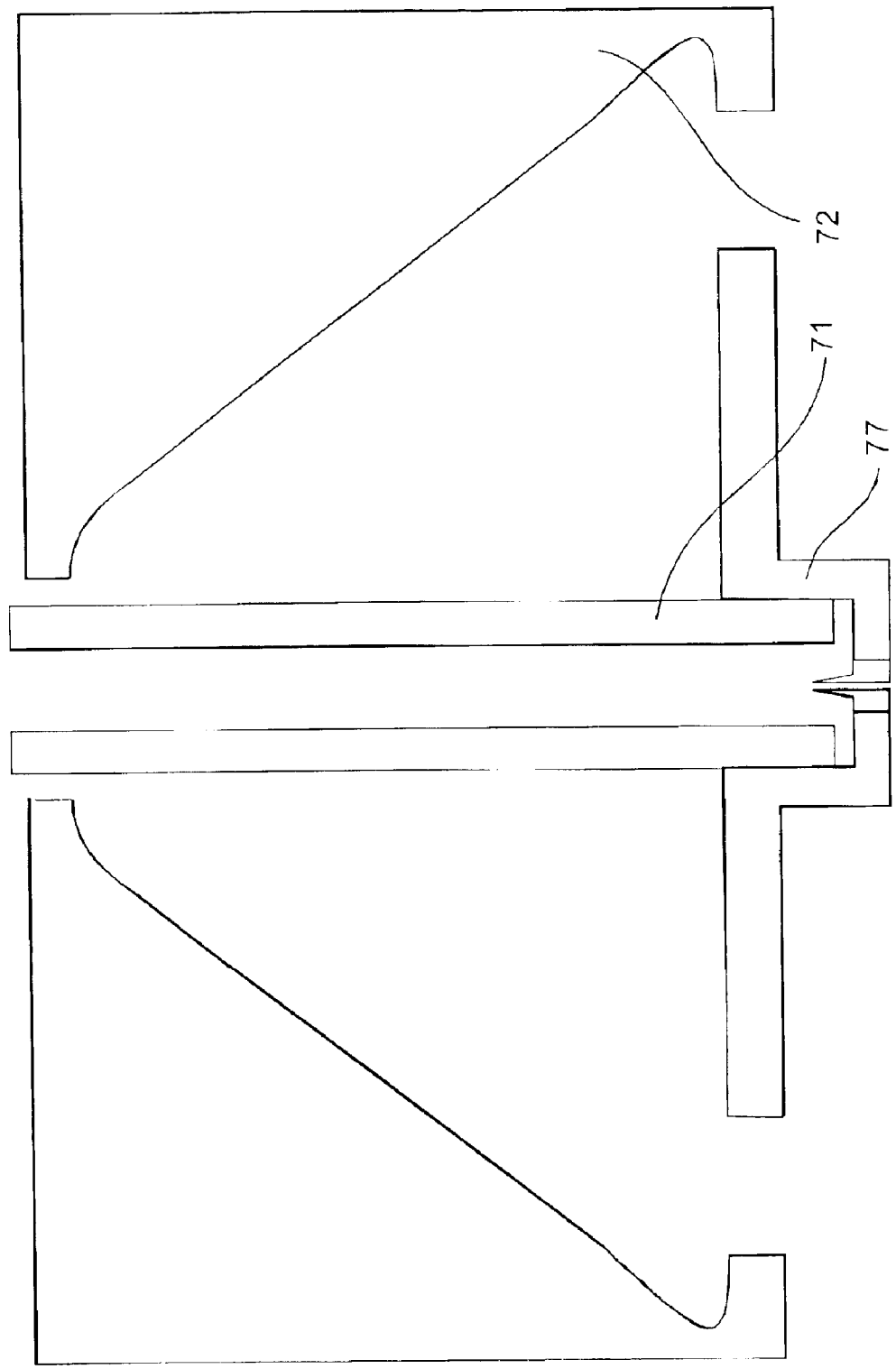
FIG. 7 is simplified section view of a blow mold and parison whose shape is based upon an embodiment of the invention.

Referring to FIG. 1, a parison 11 is extruded into an open mold 12. Referring to FIG. 1a, the mold 12 is then closed, pinching off one end of the parison 11. The pinching process also results in the fixing of the pinched portion 15 at the pinching location. A nozzle 14 injects a fluid; usually air, into the cavity 10 of the parison. The parison 11 expands as the cavity 10 within it expands, creating a large hollow shape. Referring to FIG. 1b, the shape is eventually constrained when the parison reaches the interior surface of a mold 12. Typically, when the parison 11 makes contact with the mold 12, it is cooled and thus hardened. When the interior of the mold 12 has been covered by the parison 11 and the parison 11 is cool enough, the mold may be opened and the finished part removed.

This process is well suited to creating cylindrical shapes with thin walls, such as bottles. When this process is used to create a shape with an open end, such as a pail, it is often necessary to cut away a substantial portion of the material in order to provide the pail with a wide mouth. Unfortunately, cutting away this portion results in a large amount of wasted material. Clearly, the amount of material wasted depends upon the shape of the product and the material properties of the parison however it is not unknown have a finished product that is less than half the mass of the extruded parison. Alternatively, it is known to produce two pails from a single mold such that the two pails are joined at their wide openings. Once removed from the mold cutting away material that connects to the two openings separates the pails. Unfortunately, it is very difficult to achieve a consistent wall thickness between the two pails created this way. Since the parison is not solid when it is extruded it tends to flow downwards causing the bottom pail to receive more material than the top pail. Consequently, the pails are not identical. Clearly, this problem is dependent upon a number of factors; however, generally as the parts become larger producing them with consistent wall thickness becomes more difficult.

It is well known that creating shapes whose radius varies, such as a cone, causes the thickness of the walls of the finished part to vary. As the radius increases the wall thickness of the finished part decreases. Referring to FIG. 2, in an extreme case, the cavity 10 within the parison 11 breaks through the wall of the parison and causes the parison to stop expanding. As the wall of the part being molded becomes thinner it is more prone to rupturing resulting in a failure of the molding process. Optionally, a parison with more material and hence generally thicker walls is provided, however this is wasteful and more costly.

In U.S. Pat. No. 4,724,116, filed Apr. 1, 1983, Aoki demonstrates a method of creating a blow molded elliptical cross section bottle from an extruded parison. Referring to FIG. 3, the parison 1b used in this technique has a cross section which is round on the outside but whose interior shape is not round. This allows the parison to expand substantially more in one direction than another allowing the elliptical bottle to be formed. While this technique is effective, it can only be used properly to produce a part of mainly constant cross section. Therefore, this technique cannot be used to effectively and efficiently produce a shape whose cross section varies along the extrusion axis, such as a cone.

Alternatively, injection blow molding is used to produce shapes that are not cylindrical. Referring to FIG. 4, an injection blow molding primary mold 40 is shown. The primary mold 40 has a parison 41 injected into it. Since the parison 41 is injected and not extruded the parison 41 is not limited to extruded shapes. Thus, this technique involves molding a parison 41 in a specific shape with predetermined wall thickness. Referring to FIG. 4a, the parison 41 is then blown in a second mold 42. This process permits a wide variety of blow-molded shapes to be produced, including shapes whose radius varies substantially. Unfortunately, this technique is significantly more costly than conventional blow molding. It uses two molds, instead of one and injecting the parison 41 involves high-pressure equipment.

Additionally, it is known to use a nozzle to vary the thickness of the parison. This technique works to a limited extent. In this case, the nozzle controls the thickness of the parison walls as the parison is extruded. Until the parison reaches the inner surface of the mold it tends to expand most in the thinnest section. Consequently, the areas of the parison with the most material are best suited to resisting the deformation caused by blowing. Ideally, the behaviour of the parison would be opposite. Referring to FIG. 5, a nozzle 55 is used to control the thickness of the parison 51 as it is extruded. If the parison must fill a large radius in a first region and a small radius in a second region then the thin section 50 of the extruded parison 51 is matched to the small radius 50 and the thick section 52 of the parison is matched to the larger interior radius 53 of the mold.

Referring to FIG. 6, once the process of inflating the parison 51 begins the thin section 50 of the parison 51 deforms while the thicker section 52 resists deformation. It is advisable that care be taken to ensure that the parison 51 does not rupture as it is being blown. Clearly, this technique is preferably used with relatively small changes in radius and is other than preferably useable if relatively large changes in radius along the finished part are required.

Referring to FIG. 7, in a first embodiment of the invention, the parison 71 enters the mold 72 according to a conventional extrusion blow molding process. Unlike the prior art molds described previously, this mold has a bottom surface 77 positioned relative to the extrusion head (not shown) that provides the parison 71.

Figure 8:
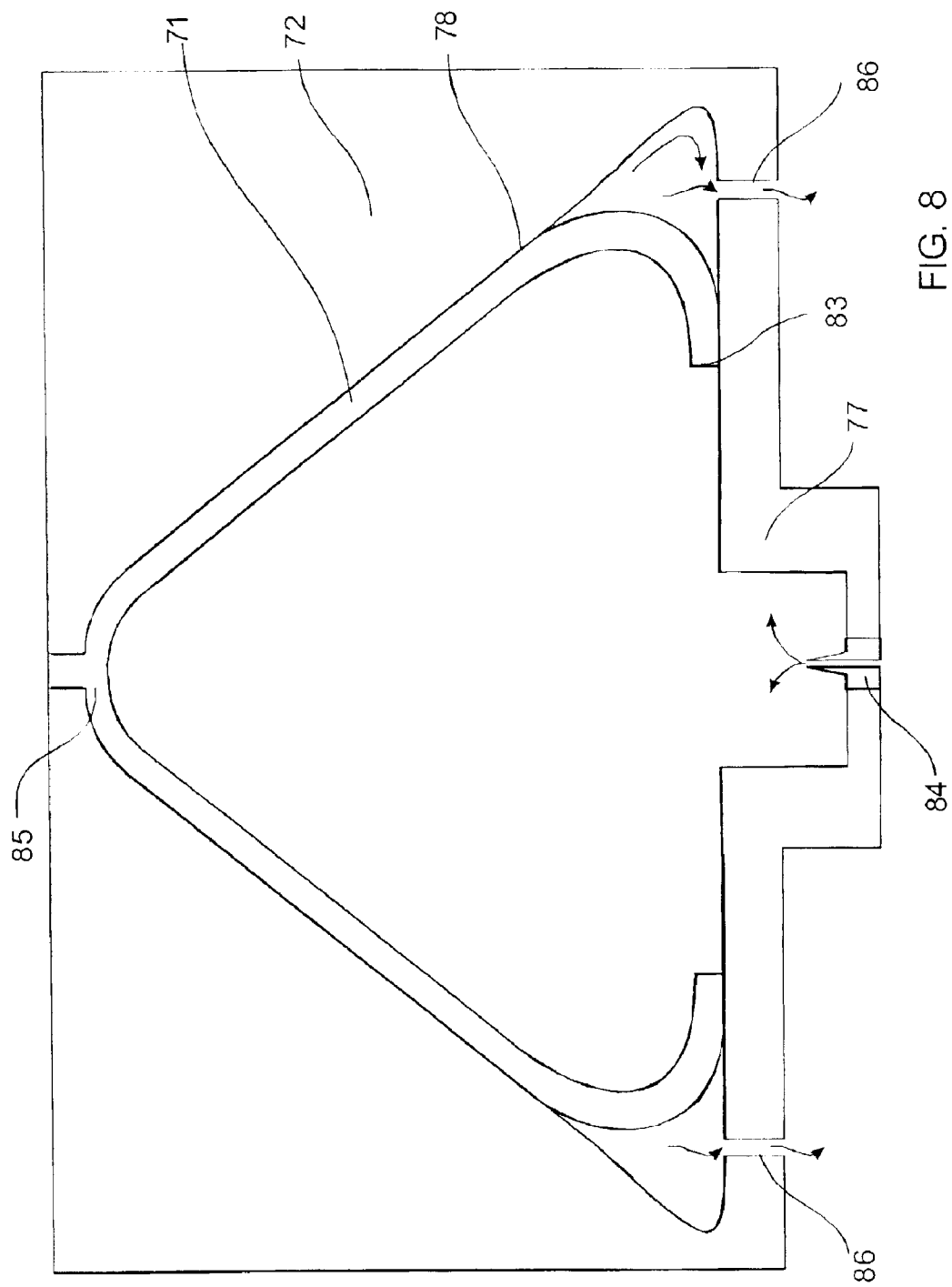
FIG. 8 is a simplified section view of a blow mold with a parison shown at varying stages of inflation, which are consistent with an embodiment of the invention.

Referring to FIG. 8, when the mold closes, it pinches the parison 71 creating a fixed closed end 85. At the opposite end of the mold a nozzle 84 is used to inject air into the parison 71. The parison 71 contacts the mold 72 sealing against it in a ring contact. Unlike the prior art, the sealing of the parison at the nozzle end is achieved by sealing the outside surface of the parison 71 against the inside surface of the mold 72. As the parison 71 is blown, the free moving end 83 slides within the mold supporting an overall increased wall thickness of the parison 71. To further assist the blowing process, vents 86 in the mold ensure that any gasses in the mold escape as the parison 71 is inflated. The bottom surface 77 of the mold 72 is maintained at a higher temperature than the sidewalls 78 of the mold 72 to reduce the likelihood of the parison from bonding to the bottom surface 77.

Of course, it is essential that at least a partial seal be formed between the parison and sidewall of the mold to ensure that the gas entering through nozzle 84 does not escape though the vents 86 without substantially expanding the parison.

As shown in FIG. 8, an end of the parison 71 moves relative to the bottom of the mold. Initially, the parison 71 forms a seal proximate a bottom of the mold. As gas is introduced into the parison 71, it expands in circumference and in an intermediary state of expansion. As is evident in the figure, the bottom 83 of the parison 71 has moved but still forms a seal with the bottom surface 77 of the mold. As more gas is introduced, the parison moves to a more molded position where the end of the bottom 83 of the parison 71 is now sliding along an edge of the mold as its circumference expands. Finally, with a little more expansion the part is fully molded. This technique is highly advantageous for making parts with a large opening at one end because it reduces the need for cutting away unwanted material.

Optionally, another embodiment of the invention is created by combining an apparatus consistent with the first embodiment of the invention and extruding head with a nozzle that permits varying the thickness of the extruded parison. Varying the thickness of the parison and using the technique of sliding along a sealing surface permit the production of a finished shape with large variation in radius while maintaining the advantage of providing an open end and therefore conserving parison material.

Referring again to FIG. 1a, producing such a part involves adding additional material in the parison to ensure that it fills the mold without breaching. Further, much of this additional material is removed when the bottom end is opened to form the finished product—a pail. In contrast to the prior art, the finished pail is molded with an open end thereby eliminating the need to either cut out an open end or separate two pails that are made in a same mold and separated after the molding process. Thus, fewer operations are needed to make the pail thereby reducing costs.

When the part has cooled it is removed from the mold. Finishing of the part is optionally performed at this stage. The present invention allows for molding of an open-ended part with only a small excess of material to be removed. Further, since one end of the parison is free to slide within the mold, the resulting molded part has more uniformity in sidewall thickness. This allows the mold operator to use a minimum of material without compromising the strength of the finished product.

Figure 9:
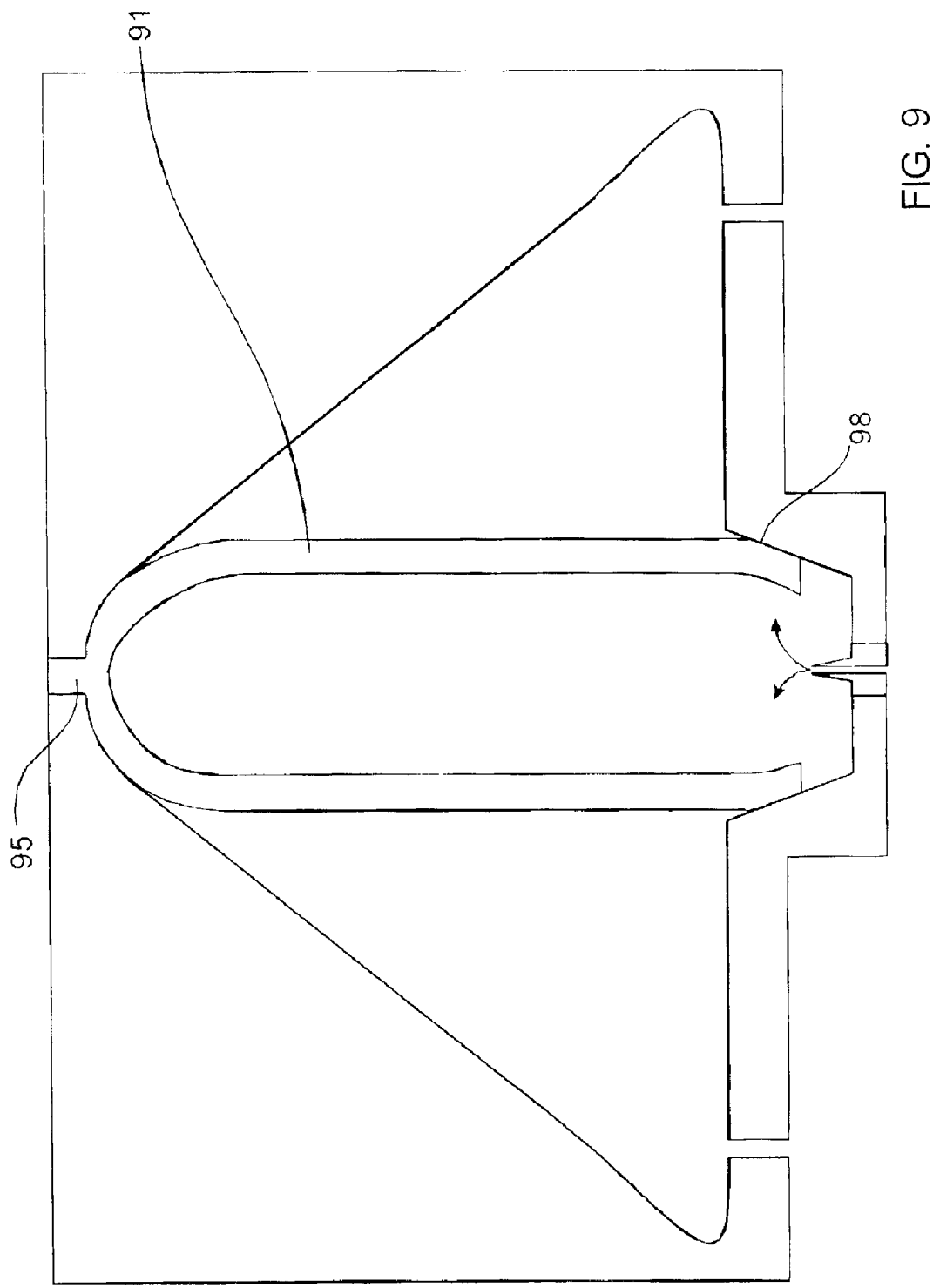
FIG. 9 is a simplified section view of a blow mold in which the outside wall of the parison has formed a seal with the inside surface of the mold whose shaped is based upon an embodiment of the invention.

In another embodiment, shown in FIG. 9, the tooling for the blow molding process is simplified by tapering the surface that the parison 91 seals against. This is achieved by decreasing the radius of the mold to an amount that equal to the outside radius of the parison 91 prior to inflation. Thus, the parison 91 slides along this surface 98 as it is extruded. In this embodiment, the opposite end of the parison 91 is pinched, forming a pinched end 95. When blowing occurs the parison 91 expands against this surface, improving a quality of the seal already formed. As the parison 91 passes the minimum interior radius of the part it expands radially and therefore it maintains the seal between it and the mold. In prior art systems, the parison is pinched—sealed and fixed—at opposing ends of the mold, however, using the present inventive technique, it is not required that both ends of the parison 91 be pinched. Consequently, it is now possible to vary the length of the extruded parison to adjust the thickness of the walls of the finished part. Clearly, it is advantageous that the parison 91 does not bond rigidly to the surface 98, but instead, be sealed against it and slide along it. To achieve this result, the bottom portion of the mold, henceforth referred to as the "bucket", is kept at a temperature sufficient for reducing the likelihood of bonding between it and the parison 91.

Preferably, the mold is designed to prevent the parison from losing its seal with the mold in order to improve a reliability of the mold for use with the present process.

Figure 10:
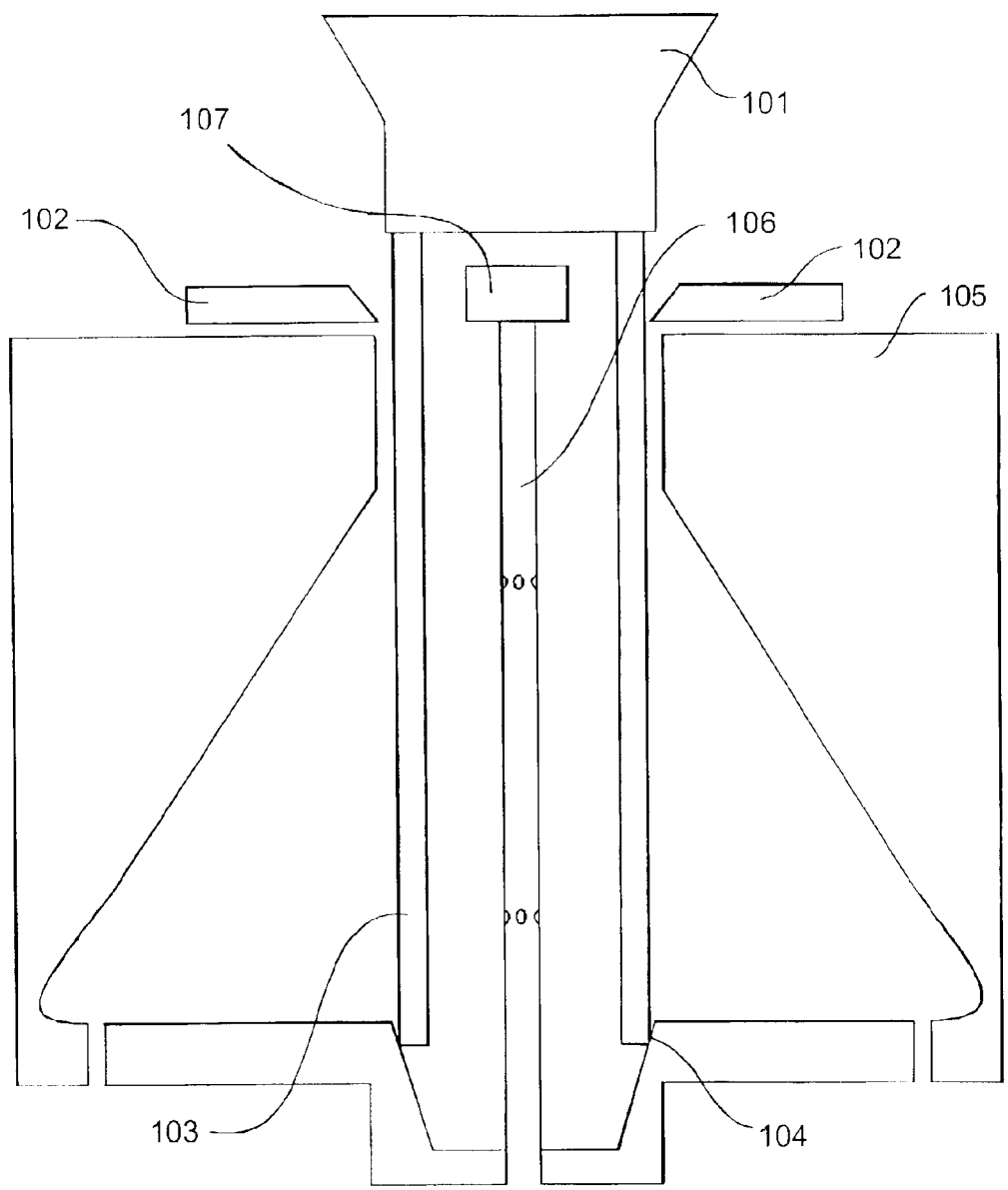
FIG. 10 is a section view of a blow mold with post extending upwards from the bottom surface of the mold.

Referring to FIG. 10, in yet another embodiment of the invention, a mold 105 is illustrated featuring an extrusion head 101, pinching plates 102, an extruded parison 103, a sealing surface 104, a post 106, and a sealing block 107. The mold 105 is shown in the closed position. The extrusion head 101 provides the molten parison 103 that slides over the post 106. The parison 103 forms a seal with the mold 105 at the sealing surface 104. When the extrusion head 101 has provided a sufficient amount of material, the pinching plates 102 secure the parison 103 and form a seal between the parison 103 and the sealing block 107. The parison 103 is blown forming a shape according to the interior surface of the mold 105. Once again, since the parison 103 is permitted to slide along the bottom surface of the mold 105 this technique supports a variety of shapes having varying radii. This embodiment is highly beneficial because it allows the mold operator to produce parts with two open ends, such as a funnel. Allowing both ends to be open further reduces the amount of wasted material and effort associated with trimming and disposing of the wasted material. Although the sealing block 107 is shown attached to a post 106 that extends from the bottom surface of the mold this need not be the case. In an alternative embodiment, the sealing block 107 is attached to the extrusion head 101.

In an alternative embodiment of the invention when the parison 103 has formed a seal with the sealing surface 104, the operation of blowing the parison 103 is initiated. Thus, the parison 103 is inflated sooner and the mold is capable of producing parts at a faster rate than would be anticipated by a similar machine according to the prior art in which the mold provides the sealing surface when the mold closes.

In yet another embodiment of the invention, the blowing of the parison begins prior to pinching off the end with the pinching plates 102. Thus, the parison 103 is being blown before the step of extruding the parison 103 is finished. This is also highly advantageous as it further reduces cycle time for the mold 105. As will be appreciated by a person of skill in the art of blow molding, the inflation of the parison prior to closing the mold is limited.

Numerous other embodiments of the invention may be envisioned without departing from the spirit or scope of the invention.

What is claimed is:

1. A tool for use in extrusion blow molding comprising
a fluid inlet for providing airflow;
a parison inlet for receiving a parison therethrough;
a support structure for maintaining a mold having a cooling surface and having a cooling surface geometry related to a predetermined finished shape of the parison;
a sealing surface for in use sealing with a sealing portion of a parison and shaped for allowing the sealing portion of the parison to move thereon while maintaining a sealed relationship therewith;
a first end for having the parison inlet; and;
a second end opposite the first end and having the sealing surface proximate thereto,
wherein the sealing surface is tapered toward the second end and thereby allowing the sealing portion of the parison to expand.

2. A tool according to claim 1, wherein the parison inlet comprises an extrusion head for having a parison having varied wall thickness extruded therethrough.

3. A tool according to claim 1, comprising a guiding member disposed approximately along a path between the parison inlet and the scaling surface for guiding a region enclosed by the parison from the parison inlet to the sealing surface.

4. A tool for use in extrusion blow molding comprising:
a fluid inlet for providing airflow;
a parison inlet for receiving a parison therethrough;
a support structure for maintaining a mold having a cooling surface and having a cooling surface geometry related to a predetermined finished shape of the parison;
a sealing surface for in use sealing with a sealing portion of a parison and shaped for allowing the sealing portion of the parison to move thereon while maintaining a sealed relationship therewith; and
a temperature control system for maintaining a temperature of the scaling surface greater than a temperature of a cooling surface of a mold mounted thereon.

5. A tool for use in extrusion blow molding comprising:
a fluid inlet for providing airflow;
a parison inlet for receiving a parison therethrough;
a support structure for maintaining a mold having a cooling surface and having a cooling surface geometry related to a predetermined finished shape of the parison; and,
a sealing surface for in use sealing with a sealing portion of a parison and shaped for allowing the sealing portion of the parison to move thereon while maintaining a sealed relationship therewith,
wherein the parison inlet comprises:
an extrusion head for providing a parison through the parison inlet;
a block positioned to permit the parison to slide over the block as the parison is extruded; and,
a pinching plate having a first position and a second position such that in the first position the pinching plate is other than interfering with the parison and in the second position said pinching plate seals the hollow parison against the block such that when a fluid is injected through the fluid inlet into the parison the fluid is substantially prevented from exiting the parison in a region of contact between the parison and the block.

6. A tool according to claim 5, wherein the sealing surface is tapered.

7. A tool according to claim 6, wherein the parison inlet comprises an extrusion head for having a parison having varied wall thickness extruded therethrough.

8. A tool according to claim 5, wherein the parison inlet comprises an extrusion head for having a parison having varied wall thickness extruded therethrough.

* * * * *